(12) United States Patent
Lamping et al.

(10) Patent No.: US 7,636,714 B1
(45) Date of Patent: Dec. 22, 2009

(54) DETERMINING QUERY TERM SYNONYMS WITHIN QUERY CONTEXT

(75) Inventors: John Lamping, Los Altos, CA (US); Steven Baker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 300 days.

(21) Appl. No.: 11/096,726

(22) Filed: Mar. 31, 2005

(51) Int. Cl.
*G06F 17/30* (2006.01)
(52) U.S. Cl. ............................................. 707/5; 707/2
(58) Field of Classification Search ........................ None
See application file for complete search history.

(56) References Cited

U.S. PATENT DOCUMENTS

| | | | |
|---|---|---|---|
| 5,826,260 A | 10/1998 | Byrd et al. | |
| 6,285,999 B1 | 9/2001 | Page | |
| 6,519,585 B1 * | 2/2003 | Kohli | 707/3 |
| 6,651,054 B1 | 11/2003 | de Judicibus | |
| 6,671,711 B1 | 12/2003 | Pirolli et al. | |
| 6,675,159 B1 * | 1/2004 | Lin et al. | 707/3 |
| 6,701,309 B1 * | 3/2004 | Beeferman et al. | 707/3 |
| 6,718,363 B1 | 4/2004 | Ponte | |
| 6,732,088 B1 * | 5/2004 | Glance | 707/3 |
| 6,751,611 B2 | 6/2004 | Krupin et al. | |
| 6,829,599 B2 | 12/2004 | Chidlovskii | |
| 6,856,957 B1 | 2/2005 | Dumoulin | |
| 7,031,961 B2 | 4/2006 | Pitkow et al. | |
| 2002/0002438 A1 | 1/2002 | Ohmura et al. | |
| 2003/0014399 A1 | 1/2003 | Hansen et al. | |
| 2003/0093408 A1 | 5/2003 | Brown et al. | |
| 2003/0135413 A1 | 7/2003 | Nishi et al. | |
| 2003/0210666 A1 | 11/2003 | Trossen et al. | |
| 2003/0212666 A1 | 11/2003 | Basu et al. | |
| 2003/0217052 A1 | 11/2003 | Rubenczyk et al. | |
| 2004/0083211 A1 | 4/2004 | Bradford | |
| 2004/0199419 A1 * | 10/2004 | Kim et al. | 705/14 |
| 2004/0199498 A1 * | 10/2004 | Kapur et al. | 707/3 |
| 2005/0027691 A1 | 2/2005 | Brin et al. | |
| 2005/0044224 A1 | 2/2005 | Jun et al. | |
| 2005/0071337 A1 | 3/2005 | Baranczyk et al. | |
| 2005/0125215 A1 * | 6/2005 | Wu et al. | 704/1 |

(Continued)

OTHER PUBLICATIONS

Jaczynski, M. et al., "Broadway: A Case-Based System for Cooperative Information Browsing on the World-Wide-Web," INRIA Sophia-Antipolis, Action AID, 12 pages.

(Continued)

*Primary Examiner*—Tim T. Vo
*Assistant Examiner*—Jau-Shya Meng
(74) *Attorney, Agent, or Firm*—Fenwick & West LLP

(57) ABSTRACT

A method is applied to search terms for determining synonyms or other replacement terms used in an information retrieval system. User queries are first sorted by user identity and session. For each user query, a plurality of pseudo-queries is determined, each pseudo-query derived from a user query by replacing a phrase of the user query with a token. For each phrase, at least one candidate synonym is determined. The candidate synonym is a term that was used within a user query in place of the phrase, and in the context of a pseudo-query. The strength or quality of candidate synonyms is evaluated. Validated synonyms may be either suggested to the user or automatically added to user search strings.

19 Claims, 4 Drawing Sheets

U.S. PATENT DOCUMENTS

| | | |
|---|---|---|
| 2005/0149499 A1* | 7/2005 | Franz et al. ............. 707/3 |
| 2005/0198068 A1* | 9/2005 | Mukherjee et al. ....... 707/104.1 |
| 2005/0256848 A1* | 11/2005 | Alpert et al. ............ 707/3 |
| 2006/0031214 A1 | 2/2006 | Solaro et al. |
| 2006/0074883 A1 | 4/2006 | Teevan et al. |
| 2007/0106937 A1 | 5/2007 | Cucerzan et al. |

OTHER PUBLICATIONS

Cui, Hang et al., "Probabilistic Query Expansion Using Query Logs", Proceedings of the 11th International Conference on the World Wide Web, May 7-11, 2002, Honolulu, HI, 8 pages.

U.S. Appl. No. 11/096,726, filed Mar. 30, 2005, Lamping et al.

U.S. Appl. No. 11/090,302, filed Mar. 28, 2005, Lamping et al.

U.S. Appl. No. 10/900,021, filed Jul. 26, 2004, Patterson.

U.S. Appl. No. 10/878,926, filed Jun. 28, 2004, Battle et al.

U.S. Appl. No. 10/734,584, filed Dec. 15, 2003, Bem et al.

U.S. Appl. No. 11/676,571, filed Sep. 30, 2003, Harik et al.

U.S. Appl. No. 10/668,721, filed Sep. 22, 2003, Haahr et al.

PCT International Search Report and Written Opinion, PCT/US05/10681, Oct. 18, 2006, 7 Pages.

PCT International Search Report and Written Opinion, PCT/US06/09076, Sep. 20, 2007, 8 pages.

"How the Vivisimo Clustering Engine Works", Vivisimo, Inc., 2003, 2 pages.

Chang, D. T., "HieNet: A User-Centered Approach for Automatic Link Generation," ACM, Hypertext '93 Proceedings, Nov. 1993, pp. 145-158.

Boyan, J.A. et al., "Learning Evaluation Functions for Global Optimization and Boolean Satisfiability," 1998, [online] Retrieved from the Internet <URL:http://www.autonlab.org/autonweb/14682/version/2/part/5/data/boyan-learning.pdf?branch=main&language=en>.

\* cited by examiner

| Test 310 | Score 320 | Base 330 | High 340 |
|---|---|---|---|
| frequently_alterable 350 | Ratio of pseudo-queries of a particular type that can be derived from both the original phrase and the synonym<br>= i)/TDQ | 0.01 | 0.015 |
| frequently_much_in_common 360 | Fraction of user queries for which an altered query has at least three search results in common with the original query<br>= iv)/ii) | 0.6 | 0.85 |
| frequently_altered 370 | Fraction of user queries for which the original query is followed by the altered query within a user session<br>= v)/TDQ | 0.0005 | 0.0015 |
| high_altering_ratio 380 | Fraction of user queries for which the original query is followed by the altered query within a user session divided by the fraction of user queries for which the altered query is followed by the original query within a user session<br>= v)/vi | 1.0 | 3.0 |

FIG. 3

DETERMINING QUERY TERM SYNONYMS WITHIN QUERY CONTEXT

CROSS REFERENCE TO RELATED APPLICATIONS

This application is related to U.S. patent application Ser. No. 11/094,814, filed on Mar. 29, 2005, entitled "Integration of Multiple Query Revision Models;" and U.S. patent application Ser. No. 11/090,302, filed on Mar. 28, 2005, entitled "Determining Query Terms of Little Significance;" and U.S. patent application Ser. No. 10/629,479, filed on Jul. 28, 2003, entitled "System and Method for Providing a User Interface with Search Query Broadening;" the contents of which are hereby incorporated by reference.

FIELD OF THE INVENTION

The present invention generally relates to the field of information retrieval; and more specifically to retrieving answers to search queries and to assisting users in revising search queries.

BACKGROUND OF THE INVENTION

The World Wide Web ("web") contains a vast amount of information. Locating a desired portion of the information, however, can be challenging. This problem is compounded because the amount of information on the web, as well as the number of new users (who are typically inexperienced at web searching), are growing rapidly. Search engines can help users to locate and retrieve documents of interest.

Users attempt to express their information need with search queries, but they often fail to choose effective query terms. For example, a user may enter the query [web hosting+fort wayne] when the city of Fort Wayne is usually referred to as Ft. Wayne. Or, a user may enter [free loops for flash movie] when most relevant pages use the phrase "music," rather than "loops," or the phrase "animation" rather than "movie."

Thus, documents that satisfy a user's information need may use different words than the query terms chosen by the user to express the concept of interest. Since search engines typically rate documents based on how prominently the user's query terms are in the documents, this means that a search engine may not return the most relevant documents in such situations (since the most relevant documents may not contain the user's query terms prominently, or at all). This problem becomes progressively more serious as the number of terms in a query increases. For queries longer than three or four words, there is a strong likelihood that one of the words is not the best phrase to describe the user's information need.

As a consequence, there is a need for a method to modify or expand user queries to include or substitute synonymous query terms, so that retrieved documents may better meet the user's information needs. Solving this problem has proven to be difficult.

A simple approach to query expansion is to use pre-constructed synonym information, such as from a thesaurus or a structured lexical database like WordNet. However, thesaurus based approaches have various problems, such as that they are expensive to construct. Even when available, they are generally restricted to one language; meanwhile, there is a need to accommodate many languages, and to obtain synonym sets for each language.

A more significant issue is that the applicability of a synonym for a given phrase often strongly depends on the context in which the phrase is used. For example, "music" is not usually a good synonym for "loops," but it is a good synonym in the context of the example query above. Further, this case is sufficiently special that "music" is not listed as a synonym for "loop" in standard thesauruses; many other examples of contextually dependent non-traditional synonyms can be easily identified. And even when conventional synonyms can be identified for a term, it can be difficult to identify which particular synonyms to use in the particular context of the query.

Other conventional approaches cluster "related words." Such approaches suffer from the drawback that related words are not necessarily synonyms. For example, "sail" and "wind" would likely be clustered (because they both occur in numerous documents), but they are not synonymous. Substituting one for the other would lead to undesirable results.

Accordingly, what is needed is an automatic method that identifies potential synonyms, and that can determine contexts in which they are applicable.

SUMMARY OF THE INVENTION

The present invention includes a method for determining synonyms for search query terms, for evaluating their quality or strength, and for utilizing them to improve user queries. The method operates both the in context of particular search queries and in a context-insensitive manner, resulting in improved synonym selection for the contexts considered.

The method finds query pairs that are alike, except for certain (single- or multi-word) phrases that occur in defined positions. The differing phrases become candidate synonyms. The method then qualifies the candidate synonyms by performing a series of tests involving additional query-related information.

One such test involves frequency of usage of search terms, e.g., the number or percentage of times both terms appeared in search queries within a prescribed time interval, or within a particular user session. Another such test involves relatedness of search results, e.g., the degree of commonality of search results returned for the original search query and for a version of the latter in which the candidate synonym is substituted. Additional tests further qualify the candidate synonyms according to particular applications.

Once candidate synonyms become qualified synonyms, they can be suggested to the user. Alternately, qualified synonyms may be applied to revise or expand a query transparently to the user. In addition, qualified synonyms can be used to modify the search score associated with retrieved documents.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3 is a table illustrating several tests that may be used to qualify the quality or strength of a candidate synonym according to one embodiment of the present invention.

DETAILED DESCRIPTION OF THE PREFERRED EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1A:
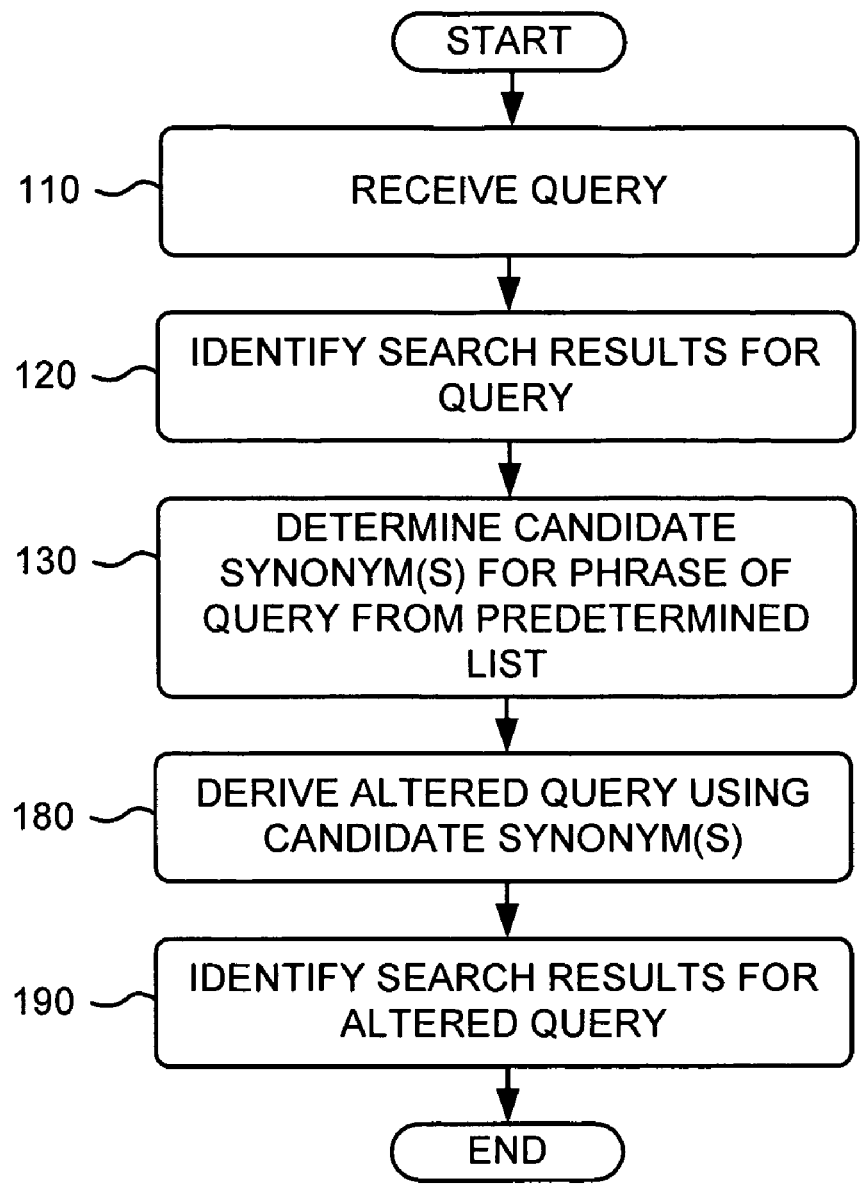
FIG. 1A is a flowchart illustrating a method of providing altered queries according to one embodiment of the present invention.

FIG. 1A is a flowchart illustrating a method of providing altered queries according to one embodiment of the present invention. Initially, a user search query is received 110. In one embodiment, a front-end server is responsible for receiving the search query submitted by the client. The front-end server provides the query to the search engine, which evaluates the query. In addition, the front-end server and/or search engine maintains various log files or lookup tables that store in memory each received user query, in association with other information. More particularly, each query is stored with a user identifier that identifies the particular browser and/or computer from which the query was received, a timestamp, and a list of some number of the search results (e.g., a list of the top ten document IDs from the search). Other information, contextual of the user, the search, or the like may also be stored.

Next, a list of search results for the user search query is identified 120. In this example, the search engine evaluates the query to retrieve a set of search results in accordance with the search query and returns the results to the front-end server. The search engine communicates with one or more of the content servers to select a plurality of documents that are relevant to the user's search query. A content server stores a large number of indexed documents, indexed (and/or retrieved) from different websites. Alternately, or in addition, the content server stores an index of documents stored on various websites. "Documents" are understood here to be any form of indexable content, including textual documents in any text or graphics format, images, video, audio, multimedia, presentations, and so forth. In one embodiment, each indexed document is assigned a page rank according to the document's link structure. The page rank serves as a query-independent measure of the document's importance. An exemplary form of page rank is described in U.S. Pat. No. 6,285,999, which is incorporated by reference. The search engine assigns a score to each document based on the document's page rank (and/or other query-independent measure of the document's importance), as well as one or more query-dependent signals of the document's importance (e.g., the location and frequency of search terms in the document).

Figure 1B:
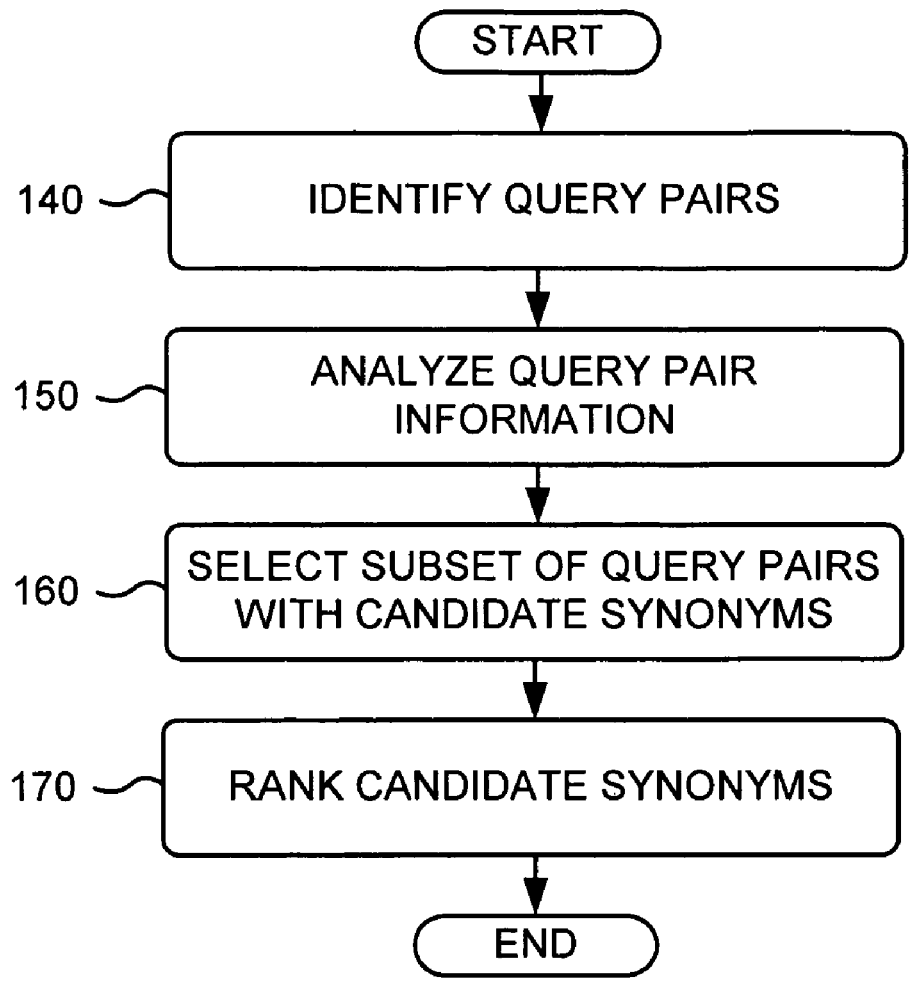
FIG. 1B is a flowchart illustrating a process for determining one or more synonymous terms in a context of the user search query according to one embodiment of the present invention.

Then, one or more synonymous terms in a context of the user search query are identified 130 from a predetermined list. Formation of the predetermined list may be accomplished using various processes. FIG. 1B is a flowchart illustrating a process for determining one or more synonymous terms in a context of the user search query according to one embodiment of the present invention. First, query pairs are identified 140. An example of this process is further described in conjunction with FIG. 2. In one embodiment, this is accomplished by analyzing user query logs and lookup tables. The set of all queries received over some period are reviewed and all original and altered query pairs are identified. An altered query is defined as a query obtained by replacing a phrase in the original user query with a candidate synonym. A "phrase," in the context of the present invention is one or more individual words or terms. For example, an original user query might be [free loops for flash movie], and the altered query might be [free music for flash movie]. In addition, certain queries may be eliminated as having insufficient context. For example, queries used in the analysis may be required to have at least three terms. To aid identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed 150. For each query pair, additional information to suggest that the phrase in the original query and altered query are synonymous is identified. For example, the evidence may include the frequency with which both queries in the pair are asked by the same user within a short time interval, or the number of top results that the original query and altered query share.

To further ensure that candidates are effectively synonymous, one or more additional tests can be used. One such test is that, for every query containing the phrase A, the corresponding query with the phrase B substituted for A has a moderately high probability of occurrence in the stored data. In one embodiment, the required probability is 1%. A second test is that, for every query containing A, the corresponding query with B substituted for A has a minimum probability of being asked by the same user in a short time interval. In one embodiment, the interval is an hour and the probability is 0.1% or greater. A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 3.

These tests can also be performed for subsets of query pairs in which the phrases appear in a particular context of adjacent words. For example, in the query pair [killer whale free photos] and [killer whale download photos], the candidate synonym pair "free," "download" appears in the context of following "whale," which can be indicated as (whale :), in the context of preceding "photos," which can be indicated as (: photos), in the context of between "whale" and "photos," which can be indicated as (whale: photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free," the general context (:); for only occurrences of "free" following "whale," the context (whale :); for only occurrences of "free" preceding "photos," the context (: photos); and for only occurrences of "free" between "whale" and "photos," the context (whale: photos). Since many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not generally (i.e., in the general context) a good synonym for "free," is a good synonym in the context (: photos), and is not a good synonym in the context (: press). The conclusion in this example is that the context (: photos) is an exception to the general rule that "download" is not a good synonym for "free."

From the query pairs, a subset is selected 160 including phrases with candidate synonyms that meet certain criteria. In one embodiment, the criteria are some or all of the tests discussed above in the general context. In another embodiment, a number of top candidate synonyms are selected for the subset of query pairs. A synonym is considered more significant than other synonyms, for example, if it is used in an altered query more often within user sessions, or if its altered query yields more search results in common with the original query.

Next, candidate synonyms are ranked 170, or qualified, using the criteria discussed above. Initially, a set of threshold conditions should be satisfied using the data gathered above and discussed in greater detail in conjunction with FIG. 3. In one embodiment, the conditions may be that for at least 65% of the original-altered query pairs, there is at least one search result in common and that the frequency with which the altered query follows (e.g., occurs within five sequential queries) the original query within a user session is at least 1 in 2000. Then, the statistics from step 150 are evaluated using a float scale function to determine a score for each qualified synonym, as discussed in greater detail in conjunction with FIG. 2. The score is a measure of the confidence in a qualified synonym. Depending on the application, greater or lesser confidence or strength will be required. Consequently, whether a qualified synonym will be declared a useful synonym will depend on the threshold value of evidence that is sufficient for the application.

Referring again to FIG. 1A, following a determination 130 of synonymous terms, one or more altered queries are derived 180. Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment, alternate queries are suggested that include the synonym, either as a substitution in or an addition to the query. In another embodiment, For example, when a user enters a given query, a number of alternative queries can be provided back to the user, along with the search results for the original query according to various methods. One such method is disclosed in U.S. application Ser. No. 11/094,814 filed on Mar. 29, 2005, entitled "Integration of Multiple Query Revision Models," which is incorporated herein by reference.

In another embodiment, the synonym is treated as equivalent to the original phrase automatically for purposes of document retrieval. For example, the original query is modified by replacing the phrase with a synonym or a disjunction of the original phrase and a synonym when producing search results for the query.

From the above steps, a list of altered search results for the altered query is identified 190. In one embodiment, this list may include a maximum number of results.

Figure 2:
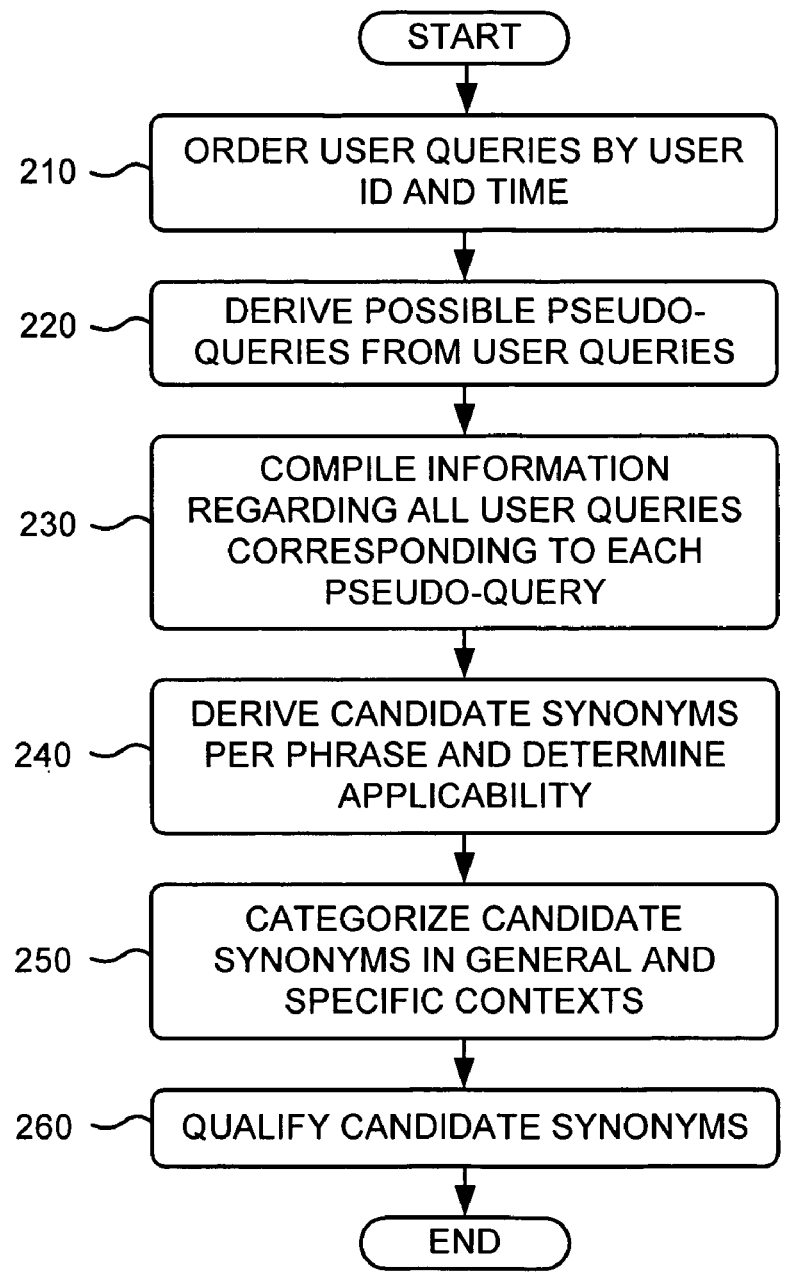
FIG. 2 depicts an example method of determining candidate synonyms for search query terms according to one embodiment of the present invention.

FIG. 2 depicts an example method of determining candidate synonyms for search query terms according to one embodiment of the invention. The method operates in the context of an information retrieval system, which generally includes a front-end server, a search engine, and an associated content server. During operation, users access the system via a conventional client over a network operating on any type of client computing device, for example, by executing a browser application or other application adapted to communicate over Internet-related protocols (e.g., TCP/IP and HTTP). The information retrieval system can operate on high performance server class computers, and the client device can be any type of computing device. The details of the hardware aspects of server and client computers are well known to those of skill in the art and thus are not further described here.

The front-end server is responsible for receiving a search query submitted by the client. The front-end server provides the query to the search engine, which evaluates the query to retrieve a set of search results in accordance with the search query, and returns the results to the front-end server. The search engine communicates with one or more of the content servers to select a plurality of documents that are relevant to the user's search query. A content server stores a large number of documents, which are indexed (and/or retrieved) from different websites. Alternately, or in addition, the content server stores an index of documents stored on various websites. "Documents" are understood here to be any form of indexable content, including textual documents in any text or graphics format, images, video, audio, multimedia, presentations, web pages (which can include embedded hyperlinks and other metadata, and/or programs, e.g., in Javascript), and so forth. In one embodiment, each indexed document is assigned a page rank according to the document's link structure. The page rank serves as a query-independent measure of the document's importance. An exemplary form of page rank is described in U.S. Pat. No. 6,285,999, which is incorporated herein by reference. The search engine assigns a score to each document based on the document's page rank (and/or other query-independent measure of the document's importance), as well as one or more query-dependent signals of the document's importance (e.g., the location and frequency of search terms in the document).

The front-end server and/or search engine maintains various log files that store each received user query, in association with other information. More particularly, each query is stored with a user identifier that identifies the particular browser and/or computer from which the query was received, a timestamp, and, for some queries, a list of some number of the search results (e.g., a list of the top ten document IDs from the search). Other information, contextual of the user, the search, or the like may also be stored. The information in the log files is then analyzed according to the methods described herein.

First all queries received over a period of time, such as a week, are sorted 210 by user ID (e.g., by cookie), and then by time. This organizes the queries into individual user sessions, where a session is defined as queries from a individual client device (or user) occurring with a given time interval, for example one hour (though longer or shorter definitions of a session may be used, as desired). Assume that within a one hour window from one user, the following queries were logged from a individual client device:

[gm cars]
[gm new car prices]
[gm used car prices]
[general motors used car prices]

First, certain queries are eliminated as having insufficient context; preferably queries used in the analysis have at least three terms. Thus, in the forgoing example, the query [gm cars] is eliminated.

For each remaining query, all possible query fragments or pseudo-queries, are formed 220 by replacing a sequence of one or more terms with a marker or token (e.g., ":"), while leaving at least two words in the pseudo-queries. For the query [gm used car prices], the pseudo-queries are:

[: used car prices]
[gm : car prices]
[gm used : prices]
[gm used car :]
[: car prices]
[gm : prices]
[gm used :]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session 230, which will be used to collect contextual information for the pseudo-queries, derive statistical information about term substitution, usage, and search result commonality. Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudo-query records as further described below. Step 230 also optionally annotates a pseudo-query record with the first ten resultant document IDs (indicated below as "url#") returned by the search engine in response to the query, either extracted from the log files (if available), or indirectly with a pointer or other reference to an external store of the results. According to one embodiment, fewer or no document Ids may be annotated, to reduce the required storage space.

If two or more user queries in a session have pseudo-queries in common, more than one record will be created that is keyed with the same pseudo-query, but the records will differ in their original user queries. In addition, if the related user queries occurred within five queries of each other, a sub-record is added to each record indicating that there was a related query in the same session. In addition, the sub-record notes the phrase that the related query had in place of the corresponding phrase in this query, and whether the related query occurred before or after the other query of the data record.

For the above example user session, one data record produced for [gm used car prices] would be {pseudo-query: [gm : car prices],
 original_query: [gm used car prices],
 phrase: used,
 related-phrases: <{phrase: new, before: yes, after: no}>
 top_results: <url370293847, url123985709, . . . >
}

Another data record would be

{pseudo-query: [: used car prices],
 original_query: [gm used car prices],
 phrase: gm,
 related_phrases: <{phrase: general motors, before: no, after: yes}>
 top_results: <url370293847, url123985709, . . . >
}

Note that in these examples pseudo-query records, the field delimiters (e.g., "pseudo-query:") are explicitly shown for illustrative purposes only, and in practice, would not be present in the actual records themselves. In addition, in these examples "related phrases" are phrases that may be classified as candidate synonyms.

One of the data records produced for the query [gm new car prices] would have the same pseudo-query as the first record above:

{pseudo-query: [gm : car prices],
 original_query: [gm new car prices],
 phrase: new,
 related_phrases: <{phrase: used, before: no, after: yes}>
 top_results: <url123985709, url1093475987, . . . >
}

Similarly, one of the data records produced for the query [general motors used car prices] would have the same pseudo-query as the second record above:

{pseudo-query: [: used car prices],
 original_query: [general motors new car prices],
 phrase: general motors,
 related_phrases: <{phrase: gm, before: yes, after: no}>
 top_results: <url370293847, url123985709, . . . >
}

The process of generating the pseudo-queries operates to make explicit the range of potential contexts of each phrase that is implicit within each query. The records corresponding to an individual pseudo-query reflect what is known (i.e., across all user queries in the logs) about one set of queries that differ in only one phrase.

The records for each pseudo-query are then analyzed 240 to generate a new set of records that reflect how well each phrase appears to function as a synonym for some other phrase, if it occurs in the given pseudo-query. Pseudo-query records are sorted by pseudo-query such that all records with the same pseudo-query are grouped together. For example, assume that the records for the pseudo-query [: used car prices] include the two from above, plus two more, all of which are shown below:

{pseudo-query: [: used car prices],
 original_query: [gm used car prices],
 phrase: gm,
 related_phrases: <{phrase: general motors, before: no, after: yes}>
 top_results: <url370293847, url123985709, . . . >
}

{pseudo-query: [: used car prices],
 original_query: [general motors new car prices],
 phrase: general motors,
 related_phrases: <{phrase: gm, before: yes, after: no}>
 top_results: <url370293847, url123985709, . . . >
}

{pseudo-query: [:used car prices],
 original_query: [ford used car prices],
 phrase: ford,
 related_phrases: < >
 top_results: <url283923887, url739572390, . . . >
}

{pseudo-query: [: used car prices],
 original_query: [gm used car prices],
 phrase: gm,
 related_phrases: < >
 top_results: <url370293847, url123985709, . . . >
}

Thus, there is another query, [ford used car prices], as well as another instance of the query [gm used car prices] from elsewhere in the logs. Step 240 generates a single record for each phrase that is identified in a pseudo-query. In other words, all records with the same pseudo-query are grouped together and a new record is created for each phrase covered by the group, reflecting how that phrase relates to the other phrases of the group for that pseudo-query. Continuing the present example, step 240 creates a record for each of the phrases "gm," "general motors" and "ford." Each record includes candidate synonyms for the respective phrase.

Each record output by step 240 indicates the ten most significant potential synonyms for each phrase. The significance of synonyms is determined at this stage independent of context according to a hierarchy of tests. First, a synonym that occurs in more related queries within sessions is considered more significant than one that appears in fewer related queries. Second, if two synonyms occur in the same number of related queries within sessions (as is likely to be the case, since relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than to simply count multiple occurrences of a given query.

Continuing with the present example, for the phrase "gm," and the pseudo-query [: used car prices], step 240 would output:

{phrase: gm,
  original_query: [gm used car prices],
  related_phrases: <{phrase: general motors, common_urls: 5, before:no, after:

yes},

{phrase: ford, common_urls: 0, before:no, after: no}>
}

As illustrated, step 240 passes on the session information from step 230. For example, the data record above reflects the session queries "gm used car prices," "general motors used car prices," and "ford used car prices." In many cases, like "ford" in this example, there the original and altered queries may occur in different sessions, yet not occur together in a single session. Step 240 also compares the search results (using, e.g., the document IDs) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this step are sorted by phrase, gathering together all records produced by step 240 for each phrase.

For each phrase, step 250 computes statistics that reflect how well each candidate synonym functions as a synonym in general (i.e., in the general context, ":"), as well as in specific contexts. In the examples at this level of the analysis, candidate synonyms are selected from the observed "related phrases." Continuing the present example, assume that for the phrase "gm," step 250 receives the above record, plus two more:

{phrase: gm,
  original_query: [gm used car prices],
  related_phrases: <{phrase: general motors, common_urls: 5, before:no, after:

yes},

{phrase: ford, common_urls: 0, before:no, after: no}>
}

{phrase: gm,
  original_query: [gm new car prices],
  related_phrases: <{phrase: general motors, common_urls: 4, before:no, after:

no},
  {phrase: 2005, common_urls: 0, before:no, after: no},
  {phrase: best, common urls: 1, before:no, after: no}>
}

{phrase: gm,
  original_query: [nutrition of gm food],
  related_phrases: <{phrase: genetically modfied, common_urls: 6, before: no, after: yes},
  {phrase: macdonalds, common urls: 0, before: no, after: no}>
}

Step 250 determines how many queries contained a particular phrase "and computes statistics for each candidate synonym of" the phrase. In one embodiment, this includes determining the number of queries for which the corresponding query with the synonym:

i) existed (i.e., appeared in the logs);
ii) existed and there was result data for both the original and altered queries, so that common results were computed;
iii) existed and had at least 3 results in common
iv) existed and had at least 1 result in common
v) appeared earlier within a session
vi) appeared later within a session In this example, for the phrase "gm," and the candidate synonym "general motors," the statistical data is:

i) existed (i.e., appeared in the logs): 2
ii) existed and there was result data for both the original and altered queries, so that common results were computed: 2
iii) existed and had at least 3 results in common: 2
iv) existed and had at least 1 result in common: 2
v) appeared earlier within a session: 0
vi) appeared later within a session: 1

This data is strongly suggestive that "general motors" is a good synonym for "gm," although, in practice, statistics should be gathered over at least 1000 queries including the phrase "gm" in order to have confidence in the statistics.

In addition to evaluating these statistics for each synonym in the general context, step 250 also gathers statistics for each context in which the phrase occurs frequently. For example, statistics are gathered for the 10,000 contexts for which the most queries exist. In this example, the contexts would be (:), (: used), (: used car), (: new), (: new car), (of :), (nutrition of :), (: food), and (of: food). Only one of the queries discussed in the above example (original queries [gm used car prices], gm new car prices], and nutrition of gm food]) belongs to each of these specialized contexts, except the general context, (:), which subsumes all three queries. Realistically, however, some contexts will include data from many queries. Step 250 evaluates the above statistics for each context, retaining, for each context, only the 20 most common candidate synonyms.

Step 260 further qualifies candidate synonyms using various tests. FIG. 3 is a table illustrating several tests that may be used to qualify the quality or strength of a candidate synonym according to one embodiment of the present invention. The tests 310 apply to statistics gathered in step 150.

The qualification begins by confirming that two preliminary conditions are satisfied. The first preliminary condition is that for at least 65% of the original-altered query pairs, there is at least one search result (e.g., a URL) in common. The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries.

If both preliminary conditions are satisfied, step 260 evaluates a number of the statistics from step 250 as a group, according weight to each statistic. The evaluation is based on the following function:

```
float Scale (float score, float base, float high) {
    float x=(score-base)/(high-base);
    float y=(x-sqrt(x*x+4.0))/2.0;
    return 1.0+y;
}
``` where score 320 (ratio the test determines), base 330 (target value), and high (scaling factor) taken from the tests 310 of FIG. 3, which are described in greater detail below.

A series of tests 310 shown in FIG. 3 that apply function Scale to the data evaluated in step 250. Scale is defined such that the value returned should be 0 when score=base, should asymptotically approach 1 when score 320 is large positive, and should be about equal to (score−base)/(high−base) when score 320 is large negative. The value of base 330 reflects a desired value for the given test. The individual tests are defined as follows.

frequently_alterable 350 provides a measure of whether, for each query with the phrase of interest, the corresponding altered query occurs often enough (preferable more than 1%) to suggest that the candidate synonym makes sense in context. This computation is i) from step 250 (queries in log) over the total number of distinct queries including the phrase (TDQ).

frequently_much_in_common 360 evaluates whether the original queries and altered queries typically exhibit enough results in common to suggest that the meanings of the phrase and candidate synonym are similar. Preferably, at least 60% of altered queries have at least 3 search results in common with the original user query. This computation is iv) from step 250 (had at least one result in common) over ii) of step 250 (result data existed for both original and altered queries).

frequently_altered 370 evaluates whether users occasionally try the substitution. Preferably, for every 2000 user queries, there is a corresponding altered query within the same session. This computation is v) from 250 (appeared earlier within a session) over TDQ.

high_altering_ratio 380 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. This computation is v) from step 250 (appeared earlier within a session) over vi) from step 250 (appeared later within a session).

The following parameters are next computed based on the above tests:

soft_and frequently_alterable+2*frequently_much_in_common+0.5*frequently_altered+high_altering_ratio evidence=1.0−exp(−soft_and/1.5), where exp is the natural exponential function, and soft_and reflects the totality of the test metrics.

The value of this variable evidence is a measure of the strength of or confidence in a synonym, qualified as discussed above. A value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the Scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided back to the user, along with the search results for the original query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" OR "general motors." Alternatively, if the evidence for a synonym is relatively weak, the synonym can be used as suggestive rather than equivalent;

Advantages of the present invention include a computer implemented method to determine synonyms to serve as substitutions for phrases within an information search query. Candidate substitutions may be suggested to the user or automatically included in addition to or in place of the original query. Alternately, the candidate substitution may be used solely to modify the score associated with the retrieved documents. A formula may be used to assess the strength or quality of candidate synonyms, and the strength or quality may be compared to a threshold that is determined according to the application of interest.

Upon reading this disclosure, those of skill in the art will appreciate still additional alternative structural and functional designs for a computer implemented method for determining synonyms for search terms used in an information retrieval system according to the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer-implemented method of searching for information in an information retrieval system, the computer-implemented method comprising:

receiving a search query comprising a plurality of terms;
selecting one of the plurality of terms, wherein unselected terms of the plurality of terms comprise remaining terms of the received search query and the selected term has a position relative to the remaining unselected terms of the received search query;
selecting, for the selected term, a replacement term that appears in a plurality of previously received multi-term search queries in a same position within the previously received multi-term search queries as the position of the selected term relative to the remaining unselected terms of the received search query;
deriving an altered query by replacing the selected term in the received query with a disjunction of the selected term and the replacement term; and
generating a list of search results for the altered query.

2. The computer-implemented method of claim 1, further comprising:
analyzing query logs containing the previously received multi-term queries, to identify:
a first plurality of multi-term search queries in which a first term appears in context with a set of other terms;
a second plurality of multi-term search queries in which a second term appears in the context with the set of other terms; and
storing in a memory the second term as a synonym for the first term in the context of the set of other terms.

3. The computer-implemented method of claim 2, wherein analyzing the query logs comprises:
identifying a pair of multi-term queries in the query logs, wherein a first multi-term query of the pair includes a first phrase in a relative position within the first multi-term query and a second multi-term query of the pair includes a second phrase in the relative position within the second multi-term query;
determining a number of search results that are common to the pair of multi-term queries; and
identifying the first phrase as synonymous with the second phrase in the context of the received query in response to the number of search results that are common to the pair of multi-term queries exceeding a threshold.

4. The computer-implemented method of claim 1, wherein selecting a replacement term comprises:
identifying multi-term query pairs in stored data;
analyzing information corresponding to the multi-term query pairs;
selecting a subset of the multi-term query pairs for which the second queries of the multi-term query pairs include candidate replacement terms for a phrase in the first queries of the multi-term query pairs; and
ranking the candidate replacement terms.

5. The computer-implemented method of claim 4, wherein the information includes evidence as to whether a phrase in the multi-term search query and a phrase in the altered query are synonymous.

6. The computer-implemented method of claim 5, wherein the evidence includes a frequency with which one of the multi-term query pairs occurs within a predetermined time interval.

7. The computer-implemented method of claim 6, wherein the predetermined time interval occurs within a single user session.

8. The computer-implemented method of claim 5, wherein the evidence includes quantity information about top results shared by the multi-term search query and the altered query.

9. The computer-implemented method of claim 4, wherein the information includes evidence as to whether a phrase in the multi-term search query and a phrase in the altered query are synonymous.

10. The computer-implemented method of claim 1, further comprising:
identifying a pair of multi-term queries in the query logs, wherein a first multi-term query of the pair includes a first phrase in a particular relative position within the first multi-term query and a second multi-term query of the pair includes a second phrase in the particular relative position within the second multi-term query;
determining a number of search results that are common to the pair of multi-term queries; and
identifying the first phrase as synonymous with the second phrase in the context of the received multi-term query in response to the number of search results that are common to the pair of multi-term queries exceeding a threshold.

11. A computer-implemented method of searching for information in an information retrieval system, the computer-implemented method comprising:
receiving a search query comprising a plurality of terms;
generating search results for the search query;
selecting one of the plurality of terms, wherein unselected terms of the plurality of terms comprise remaining terms of the received search query and the selected term has a position relative to the remaining unselected terms of the received search query;
selecting, for the selected term, a replacement term that appears in a plurality of previously received multi-term search queries in a same position within the previously received multi-term search queries of as the position of the selected term relative to the remaining unselected terms of the received search query;
providing a ranking of the search results; and
modifying the ranking of the search results based on whether the search results include the replacement term.

12. A computer-implemented method of searching for information in an information retrieval system, the computer-implemented method comprising:
receiving a search query comprising a plurality of terms;
generating a list of search results for the search query;
selecting one of the plurality of terms, wherein unselected terms of the plurality of terms comprise remaining terms of the received search query and the selected term has a position relative to the remaining unselected terms of the received search query;
selecting, for the selected term, a replacement term that appears in a plurality of previously received multi-term search queries in a same position within the previously received multi-term search queries as the position of the selected term relative to the remaining unselected terms of the received search query;
deriving an altered query by replacing the selected term in the received query with a disjunction of the selected term and the replacement term; and
generating a list of altered search results for the altered query.

13. A computer program product for searching for information in an information retrieval system, the computer program product comprising:
a computer-readable storage medium; and
computer program code, coded on the medium, for:
receiving a search query comprising a plurality of terms;
generating a list of search results for the search query;

selecting one of the plurality of terms, wherein unselected terms of the plurality of terms comprise remaining terms of the received search query and the selected term has a position relative to the remaining unselected terms of the received search query;

selecting, for the selected term, a replacement term that appears in a plurality of previously received multi-term search queries in a same position within the previously received multi-term search queries as the position of the selected term relative to the remaining unselected terms of the received search query;

deriving an altered query by replacing the selected term in the received query with a disjunction of the selected term and the replacement term; and generating a list of altered search results for the altered query.

14. A computer program product for searching for information in an information retrieval system, the computer program product comprising:

a computer-readable storage medium; and computer program code, coded on the medium, for:

receiving a search query comprising a plurality of terms;

selecting one of the plurality of terms, wherein unselected terms of the plurality of terms comprise remaining terms of the received search query and the selected term has a position relative to the remaining unselected terms of the received search query;

selecting, for the selected term, a replacement term that appears in a plurality of previously received multi-term search queries in a same position within the previously received multi-term search queries as the position of the selected term relative to the remaining unselected terms of the received search query;

deriving an altered query by replacing the selected term in the received query with a disjunction of the selected term and the replacement term; and generating a list of search results for the altered query.

15. A computer program product for determining synonyms for search query terms, the computer program product comprising:

a computer-readable storage medium; and computer program code, coded on the medium, for:

receiving a search query comprising a plurality of terms;

generating a list of search results for the search query;

selecting one of the plurality of terms, wherein unselected terms of the plurality of terms comprise remaining terms of the received search query and the selected term has a position relative to the remaining unselected terms of the received search query;

selecting, for the selected term, a replacement term that appears in a plurality of previously received multi-term search queries in a same position within the previously received multi-term search queries as the position of the selected term relative to the remaining unselected terms of the received search query;

providing a ranking of the search results; and modifying the ranking of the search results based on whether the search results include the replacement term.

16. A computer-implemented method of searching for information in an information retrieval system, the computer-implemented method comprising:

receiving a search query comprising a plurality of terms;

selecting one of the plurality of terms, wherein unselected terms of the plurality of terms comprise remaining terms of the received search query and the selected term has a position relative to the remaining unselected terms of the received search query;

selecting, for the selected terms, a replacement term that appears in a plurality of previously received multi-term search queries in a same position within the previously received multi-term search queries as the position of the selected term relative to the remaining unselected terms of the received search query;

deriving an altered query by replacing the selected terms in the received query with the replacement term; and generating a list of search results for the altered query.

17. The computer-implemented method of claim 16, further comprising:

analyzing query logs containing the previously received multi-term queries, to identify:

a first plurality of multi-term search queries in which a first term appears in context with a set of other terms;

a second plurality of multi-term search queries in which a second term appears in the context with the set of other terms; and storing in a memory the second term as a synonym for the first term in the context of the set of other terms.

18. The computer-implemented method of claim 16, wherein selecting a replacement term comprises:

identifying multi-term query pairs in stored data;

analyzing information corresponding to the multi-term query pairs;

selecting a subset of the multi-term query pairs for which the second queries of the multi-term query pairs include candidate replacement terms for a phrase in the first queries of the multi-term query pairs; and ranking the candidate replacement terms.

19. A computer program product for searching for information in an information retrieval system, the computer program product comprising:

a computer-readable storage medium; and computer program code, coded on the medium, for:

receiving a search query comprising a plurality of terms;

selecting one of the plurality of terms, wherein unselected terms of the plurality of terms comprise remaining terms of the received search query and the selected term has a position relative to the remaining unselected terms of the received search query;

selecting, for the selected terms, a replacement term that appears in a plurality of previously received multi-term search queries in a same position within the previously received multi-term search queries as the position of the selected term relative to the remaining unselected terms of the received search query;

deriving an altered query by replacing the selected terms in the received query with the replacement term; and generating a list of search results for the altered query.

* * * * *

UNITED STATES PATENT AND TRADEMARK OFFICE
CERTIFICATE OF CORRECTION

PATENT NO. : 7,636,714 B1  Page 1 of 1
APPLICATION NO. : 11/096726
DATED : December 22, 2009
INVENTOR(S) : Lamping et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Ninth Day of November, 2010

David J. Kappos
*Director of the United States Patent and Trademark Office*